US012378362B2

(12) United States Patent
Wang et al.

(10) Patent No.: US 12,378,362 B2
(45) Date of Patent: Aug. 5, 2025

(54) POLYDIORGANOSILOXANE PREPARATION

(71) Applicant: DOW SILICONES CORPORATION, Midland, MI (US)

(72) Inventors: Xiuyan Wang, Shanghai (CN); Yi Guo, Shanghai (CN); Jiang Peng, Shanghai (CN); Zhiping Zeng, Shanghai (CN); Qiang Hu, Shanghai (CN)

(73) Assignee: DOW SILICONES CORPORATION, Midland, MI (US)

( * ) Notice: Subject to any disclaimer, the term of this patent is extended or adjusted under 35 U.S.C. 154(b) by 559 days.

(21) Appl. No.: 17/786,389

(22) PCT Filed: Dec. 17, 2019

(86) PCT No.: PCT/CN2019/125816
§ 371 (c)(1),
(2) Date: Jun. 16, 2022

(87) PCT Pub. No.: WO2021/119972
PCT Pub. Date: Jun. 24, 2021

(65) Prior Publication Data
US 2023/0013216 A1    Jan. 19, 2023

(51) Int. Cl.
*C08G 77/388* (2006.01)
*C08G 77/06* (2006.01)
*C08G 77/18* (2006.01)
*C08K 3/26* (2006.01)
*C09J 183/06* (2006.01)

(52) U.S. Cl.
CPC ........... *C08G 77/388* (2013.01); *C08G 77/06* (2013.01); *C08G 77/18* (2013.01); *C08K 3/26* (2013.01); *C09J 183/06* (2013.01); *C08K 2003/265* (2013.01)

(58) Field of Classification Search
None
See application file for complete search history.

(56) References Cited

U.S. PATENT DOCUMENTS

| | | |
|---|---|---|
| 3,105,061 A | 9/1963 | Bruner |
| 3,635,887 A | 1/1972 | Polmanteer |
| 3,996,184 A | 12/1976 | Klosowski |
| 4,515,932 A | 5/1985 | Chung |
| 4,680,364 A | 7/1987 | Lucas |
| 4,962,152 A | 10/1990 | Leempoel |
| 5,017,628 A | 5/1991 | Dietlein |
| 5,053,442 A | 10/1991 | Chu et al. |
| 5,300,608 A | 4/1994 | Chu et al. |
| 5,519,104 A | 5/1996 | Lucas |
| 5,674,936 A | 10/1997 | Lucas |
| 6,162,756 A | 12/2000 | Friebe et al. |
| 6,562,931 B1 | 5/2003 | Knepper |
| 6,703,442 B1 | 3/2004 | Ando et al. |
| 7,504,468 B2 | 3/2009 | Guennouni et al. |
| 8,067,508 B2 | 11/2011 | Braun et al. |
| 8,153,261 B2 | 4/2012 | Landon et al. |
| 11,168,213 B2 | 11/2021 | Huang et al. |
| 2003/0216536 A1 | 11/2003 | Levandoski et al. |
| 2005/0288415 A1 | 12/2005 | Beers et al. |
| 2006/0074183 A1 | 4/2006 | Sakamoto et al. |
| 2007/0088110 A1 | 4/2007 | Kohl et al. |
| 2007/0237912 A1 | 10/2007 | Correia |
| 2010/0099793 A1 | 4/2010 | Wunder |
| 2010/0139843 A1 | 6/2010 | DeCato |
| 2010/0234510 A1 | 9/2010 | Feder et al. |
| 2010/0317796 A1 | 12/2010 | Huang et al. |
| 2011/0198779 A1 | 8/2011 | Davio et al. |
| 2013/0023602 A1 | 1/2013 | Dorman |
| 2013/0338289 A1 | 12/2013 | Jadot et al. |
| 2014/0235812 A1 | 8/2014 | Brandstadt et al. |
| 2014/0288222 A1 | 9/2014 | Yano et al. |
| 2014/0343202 A1 | 11/2014 | Dinkar et al. |
| 2015/0031841 A1 | 1/2015 | Horstman et al. |
| 2015/0045519 A1 | 2/2015 | Rutz et al. |
| 2015/0159051 A1 | 6/2015 | Kohl et al. |
| 2016/0340548 A1 | 11/2016 | Gubbels et al. |
| 2017/0101564 A1 | 4/2017 | Choffat |
| 2018/0258316 A1 | 9/2018 | Lucas |

(Continued)

FOREIGN PATENT DOCUMENTS

| | | |
|---|---|---|
| CN | 1382183 A | 11/2002 |
| CN | 1597824 A | 3/2005 |
| CN | 1597828 A | 3/2005 |

(Continued)

OTHER PUBLICATIONS

Knipe et al. In Situ Kinetics of Moisture-Reactive Acetoxylioxane Sealants Ind. Eng. Chem. Res. 2019, 58, 17266-17276 (Year: 2019).*
Machine assisted English translation of CN1597828A obtained from https://patents.google.com/patent on Jan. 12, 2023, 7 pages.
Machine assisted English translation of FR1494500A obtained from https://worldwide.espacenet.com/patent on Jun. 21, 2023, 6 pages.
Machine assisted English translation of CN102952270A obtained from https://patents.google.com/patent on Aug. 24, 2022, 9 pages.
Machine assisted English translation of CN103396757A obtained from https://patents.google.com/patent on Aug. 24, 2022, 9 pages.
Machine assisted English translation of CN103408941A obtained from https://patents.google.com/patent on Aug. 24, 2022, 8 pages.
Machine assisted English translation of CN104497579B obtained from https://patents.google.com/patent on Aug. 24, 2022, 11 pages.

(Continued)

*Primary Examiner* — Katarzyna I Kolb
(74) *Attorney, Agent, or Firm* — Warner Norcross + Judd LLP

(57) ABSTRACT

A process for end capping and chain extending silanol terminated polydiorganosiloxanes with a mixture of one or more alkylacetoxydialkoxysilanes and one or more alkyldiacetoxyalkoxysilanes. The resulting capped polymeric material may be utilised as a polymer in e.g. a one-part alkoxy sealant composition such as, for example, an alkoxy low modulus clean (non-staining) or clear sealant composition.

17 Claims, No Drawings

(56) References Cited

U.S. PATENT DOCUMENTS

2021/0206938 A1* 7/2021 Ganachaud ............ C08J 9/0061

FOREIGN PATENT DOCUMENTS

| | | |
|---|---|---|
| CN | 1654584 A | 8/2005 |
| CN | 102952270 A | 3/2013 |
| CN | 103298888 A | 9/2013 |
| CN | 103396757 A | 11/2013 |
| CN | 103408941 A | 11/2013 |
| CN | 105849213 A | 8/2016 |
| CN | 104497579 B | 2/2017 |
| EP | 38221 B1 | 11/1985 |
| EP | 802222 A1 | 10/1997 |
| EP | 802233 A2 | 10/1997 |
| EP | 1043356 A1 | 10/2000 |
| EP | 1238005 B1 | 9/2004 |
| FR | 1494500 A | 9/1967 |
| WO | 2013130574 A1 | 9/2013 |
| WO | 2019024430 A1 | 2/2019 |
| WO | 2019190775 A1 | 10/2019 |
| WO | 2019190776 A1 | 10/2019 |
| WO | 2019200579 A1 | 10/2019 |

OTHER PUBLICATIONS

Machine assisted English translation of CN1597824A obtained from https://patents.google.com/patent on Aug. 24, 2022, 8 pages.
Machine assisted English translation of CN1654584A obtained from https://patents.google.com/patent on Aug. 24, 2022, 9 pages.
Brook, M., "Silicon in Organic, Organometallic and Polymer Chemistry", John Wiley & Sons, Inc. (2000), pp. 284-287.
International Search Report for PCT/US2020/065475 dated Apr. 4, 2021, 3 pages.
International Search Report for PCT/CN2019/125816 dated Sep. 21, 2020, 3 pages.
International Search Report for PCT/CN2019/125817 dated Jul. 29, 2020, 3 pages.
International Search Report for PCT/CN2019/125815 dated Sep. 22, 2020, 3 pages.
International Search Report for PCT/CN2019/125814 dated Jul. 29, 2020, 3 pages.
International Search Report for PCT/CN2019/125820 dated Sep. 2, 2020, 4 pages.
Noll, W., Chemistry and Technology of Silicones, Academic Press Inc., New York, (1968) pp. 396-399.

* cited by examiner

POLYDIORGANOSILOXANE PREPARATION

CROSS-REFERENCE TO RELATED APPLICATIONS

This application is the U.S. National Stage of and claims priority to International Application No. PCT/CN2019/125816 filed on 17 Dec. 2019, the contents of which is incorporated herein by reference.

FIELD OF THE INVENTION

This relates to a process for end capping and chain extending silanol terminated polydiorganosiloxanes. The resulting capped polymeric material may be utilised as a polymer in e.g. a one-part alkoxy sealant composition such as, for example, an alkoxy low modulus clean (non-staining) or clear sealant composition.

BACKGROUND OF THE INVENTION

Room temperature vulcanizable (RTV) silicone rubber compositions are well known. Generally, such compositions comprise an —OH end-blocked diorganopolysiloxane polymer or an alkoxy end-blocked polydiorganosiloxane which may have an alkylene link between the end silicon atoms and one or more suitable cross-linking agents designed to react with the —OH and/or alkoxy groups and thereby cross-link the composition to form an elastomeric sealant product. One or more additional ingredients such as catalysts, reinforcing fillers, non-reinforcing fillers, diluents (e.g. plasticisers and/or extenders), chain extenders, flame retardants, solvent resistant additives, biocides and the like are often also incorporated into these compositions as and when required. One application for such compositions are as sealants for the construction industry.

Low modulus room temperature vulcanisable (RTV) silicone compositions can be used in a wide variety of applications. For example, they have achieved considerable commercial success as highway sealants and more recently in the construction industry. In certain applications, such as the construction of high-rise buildings, it is desirable and often critical to utilize low modulus sealants and/or adhesives for adhering window panes to the frames (metal or otherwise) of a building structure. The low modulus property enables the resulting cured silicone elastomers to easily compress and expand with building movement without causing cohesive or adhesive failure.

Indeed recent architectural trends towards "mirrored" high rise buildings, that is, high rise buildings where the exterior of the building has the appearance of being a large mirror, for both aesthetic and energy-saving reasons, have resulted in there being a great deal of interest in providing suitable low modulus silicone sealants to deliver such effects.

The low modulus property in a sealant may be achieved by, for example, using a linear polymer with a higher molecular weight such that the molecular weight between crosslinking points is increased or by using a large amount of unreactive diluents (plasticisers and/or extenders, sometimes referred to as processing aids) but the latter are known to cause staining as they are unreactive and can leech out from a cured elastomeric sealant which is not acceptable for some applications e.g. stone facades. Hence, typically non-staining, low modulus sealants rely on high molecular weight/chain length polydiorganosiloxane polymers which are end-blocked with alkoxy reactive groups but also have low levels of reactive groups attached to silicon atoms along the polymer chain in order to generate cross-linked elastomeric products with low cross-link densities.

Such polymers have often been prepared using chain extension processes for which suitable reactive silanes may be utilised as chain extenders.

However, whilst it is known that alkoxy terminated polymers can be prepared by reacting di-, tri or tetralkoxysilanes with silanol terminated polydiorganosiloxanes, the reaction is not as straightforward as might be anticipated and a wide variety of catalysts have been proposed for this purpose including amines, inorganic oxides, potassium acetate, titanium/amine combinations, carboxylic acid/amine combinations, lithium hydroxide and oxime-containing organic compounds, all of which are problematic. For example, amine catalyst systems are slow, particularly given the level of reactivity of many of the alkoxysilanes involved in the process. In addition, amines and carboxylic acid catalysts are corrosive and require special handling and removal processes once the reaction has proceeded to the desired state of completion. Lithium hydroxide, being an inorganic solid, requires a polar solvent such as methanol to introduce it as a solution into the reaction. However, the presence of methanol leads to a continual regeneration of the catalyst e.g. in the form of lithium methoxide and consequently, the resultant polymer product exhibits a rapid lowering of viscosity due to interaction with said regenerated lithium catalyst. Furthermore, many of these catalysts are unpleasant in that they can release displeasing odours and are dangerous to eyes and skin, but their removal is often difficult, requiring extra steps which are laborious and costly.

Organic titanium catalysts such as titanium tetra isoprionate have also been previously considered for the preparation of alkoxy end-capped polydiorganosiloxane polymers but they form complexes with the OH polymer starting materials which leads to significant thickening of the polymer matrix. Whilst this titanium-silicon complexing is reversible, it requires high shear mixing to breakdown this thick phase which the industry seeks to avoid because of additional cost and time required to do so.

The introduction of unreactive liquid plasticisers/extenders (sometimes referred to as process aids) has been utilised to produce low modulus sealants. They are used as a means of lowering viscosity of uncured compositions. However, once cured the unreactive liquids within the cured sealant may migrate and potentially bleed out of the sealant which, over an extended period of time, can result in the sealant failing and often causes staining and discoloration in/on adjacent substrates.

Hence, there is a definite need for an alternative process for making viscosity stable chain-extended alkoxy terminated organopolysiloxanes. Such a would be desired to contain non-corrosive ingredients, be fast and not suffer from the disadvantages of the prior art catalyst systems. Additionally, there is a need for the aforementioned viscosity stable chain-extended alkoxy terminated organopolysiloxanes resulting from the above process to be used in low modulus sealant compositions which exhibit stable shelf life and are suitable, upon cure, to provide non-staining (clean) sealants, adhesives, coatings and the like.

BRIEF SUMMARY OF THE INVENTION

The disclosure herein seeks to provide a suitable alternative process for the production of viscosity stable chain-extended alkoxy terminated organopolysiloxanes which can be utilised in low modulus silicone sealant compositions to generate, upon cure, clean (non-staining) low modulus (e.g. ≤0.4 MPa at 100% elongation in accordance with Test Methods GB/T 14683 and GB/T23261) silicone sealants.

DETAILED DESCRIPTION OF THE INVENTION

There is provided herein a process for preparing a chain-extended alkoxy polydiorganosiloxane from a silanol terminated polydiorganosiloxane starting material comprising:—
(i) reacting said silanol terminated polydiorganosiloxane starting material with a mixture of one or more alkylacetoxydialkoxysilanes and one or more alkyldiacetoxyalkoxysilanes wherein each alkyl group may be the same or different and contains from 1 to 6 carbons and each alkoxy group may be the same or different and contains from 1 to 6 carbons; and
(ii) neutralising the resulting mixture.

It will be seen that the process described above does not require a catalyst. Furthermore, the combination of acetoxy and alkoxy groups in alkylacetoxydialkoxysilanes and one or more alkyldiacetoxyalkoxysilanes results prompts the more reactive acetoxy group to react with the terminal silanol groups of the starting material. Furthermore, using alkylacetamide silanes for neutralization (e.g. N,N'-(dimethylsilylene)bis[N-ethylacetamide]) can both function as neutralising agent but may also provide additional chain-extension when present.

There is also provided herein an alkoxy end-capped, chain extended polydiorganosiloxane polymer obtainable from the process of:—
(i), reacting said silanol terminated polydiorganosiloxane with a mixture of one or more alkylacetoxydialkoxysilanes and one or more alkyldiacetoxyalkoxysilanes wherein each alkyl group may be the same or different and contains from 1 to 6 carbons and each alkoxy group may be the same or different and contains from 1 to 6 carbons; and
(ii) neutralising the resulting mixture.

There is also provided herein a process of preparing a one-part low modulus silicone sealant composition by preparing (a) an alkoxy end-capped, chain extended polydiorganosiloxane polymer by way of the process described herein and mixing same with
(b) reinforcing filler;
(c) cross-linker;
(d) cure catalyst; and optionally
(e) adhesion promoter.

There is also provided the use of an alkoxy end-capped, chain extended polydiorganosiloxane polymer prepared by way of the process described herein as a polymer in the preparation of a one-part low modulus silicone sealant composition.

The silanol terminated polydiorganosiloxane starting material has at least two silanol groups per molecule has the formula

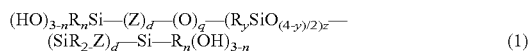  (1)

in which each R is an alkyl, alkenyl or aryl group, and Z is a divalent organic group; d is 0 or 1, q is 0 or 1 and d+q=1; n is 0, 1 or 2, y is 0, 1 or 2, and z is an integer such that said organopolysiloxane polymer starting material has a viscosity of from 10,000 to 75,000 mPa·s at 25° C., alternatively from 10,000 to 60,000 mPa·s at 25° C., in accordance with ASTM D1084-16 using a Brookfield rotational viscometer with spindle CP-52 at 1 rpm.

Typically in the above d is 0, q is 1 and n is 1 or 2. In such a case the silanol terminated polydiorganosiloxane starting material has the following structure:

With R, y and z being as described above, the average value of y is about 2, i.e. the silanol terminated polymer is substantially (i.e. >90% linear, alternatively >97% linear.

Each R is individually selected from alkyl groups, alternatively alkyl groups having from 1 to 10 carbon atoms, alternatively from 1 to 6 carbon atoms, alternatively 1 to 4 carbon atoms, alternatively methyl or ethyl groups; alkenyl groups alternatively alkenyl groups having from 2 to 10 carbon atoms, alternatively from 2 to 6 carbon atoms such as vinyl, allyl and hexenyl groups; aromatic groups, alternatively aromatic groups having from 6 to 20 carbon atoms, substituted aliphatic organic groups such as 3,3,3-trifluoropropyl groups aminoalkyl groups, polyaminoalkyl groups, and/or epoxyalkyl groups.

Each Z is independently selected from an alkylene group having from 1 to 10 carbon atoms. In one alternative each Z is independently selected from an alkylene group having from 2 to 6 carbon atoms; in a further alternative each Z is independently selected from an alkylene group having from 2 to 4 carbon atoms. Each alkylene group may for example be individually selected from an ethylene, propylene, butylene, pentylene and/or hexylene group. However, as previously indicated in the present instance d is usually 0 (zero).

The silanol terminated polydiorganosiloxane starting material has a viscosity of from 1,000 to 75,000 mPa·s at 25° C., alternatively from 1000 to 60,000 mPa·s at 25° C., in accordance with ASTM D1084-16 using a Brookfield rotational viscometer with spindle CP-52 at 1 rpm, z is therefore an integer enabling such a viscosity, alternatively z is an integer from 300 to 5000.

The silanol terminated polydiorganosiloxane starting material can be a single siloxane represented by Formula (1) or it can be mixtures of polydiorganosiloxane polymers represented by the aforesaid formula. Hence, the term "siloxane polymer mixture" in respect to the silanol terminated polydiorganosiloxane starting material is meant to include any individual polydiorganosiloxane polymer starting material or mixtures of polydiorganosiloxane polymer starting materials.

The Degree of Polymerization (DP), (i.e. in the above formula substantially z), is usually defined as the number of monomeric units in a macromolecule or polymer or oligomer molecule of silicone. Synthetic polymers invariably consist of a mixture of macromolecular species with different degrees of polymerization and therefore of different molecular weights. There are different types of average polymer molecular weight, which can be measured in different experiments. The two most important are the number average molecular weight (Mn) and the weight average molecular weight (Mw). The Mn and Mw of a silicone polymer can be determined by Gel permeation chromatography (GPC) with precision of about 10-15%. This technique is standard and yields Mw, Mn and polydispersity index (PI). The degree of polymerisation (DP)=Mn/Mu where Mn is the number-average molecular weight coming from the GPC measurement and Mu is the molecular weight of a monomer unit. PI=Mw/Mn. The DP is linked to the viscosity of the polymer via Mw, the higher the DP, the higher the viscosity.

In a first stage of the process the silanol terminated polydiorganosiloxane starting material described above is reacted with a mixture of one or more alkylacetoxydialkoxysilanes and one or more alkyldiacetoxyalkoxysilanes.

Each alkylacetoxydialkoxysilane contains one alkyl group and two alkoxy groups. The alkyl group contains from 1 to 6 carbons, alternatively is selected from methyl, ethyl, propyl, n-butyl, iso-butyl, pentyl or hexyl, alternatively each alkyl group is an ethyl or methyl group, alternatively each alkyl group is a methyl group. The alkoxy groups in each alkylacetoxydialkoxysilane may be the same or different and contain from 1 to 6 carbons. Illustrative alkoxy groups are methoxy, ethoxy, propoxy, isopropoxy, butoxy, isobutoxy, pentoxy and, hexoxy groups. Alternatively, each alkoxy group may be the same or different and may be selected from methoxy, ethoxy, propoxy, isopropoxy, butoxy and isobutoxy groups, alternatively each alkoxy group is either an ethoxy or methoxy group. In one embodiment the alkylacetoxydialkoxysilane is selected from methylacetoxydimethoxysilane, ethylacetoxydimethoxysilane, ethylacetoxydiethoxysilane, methylacetoxydiethoxysilane, methylacetoxymethoxyethoxysilane and/or ethylacetoxymethoxyethoxysilane. Alternatively, the alkylacetoxydialkoxysilane is a methylacetoxydimethoxysilane.

Each alkyldiacetoxyalkoxysilane contains one alkyl group and one alkoxy groups. The alkyl group contains from 1 to 6 carbons, alternatively is selected from methyl, ethyl. Propyl, n-butyl, iso-butyl, pentyl or hexyl, alternatively each alkyl group is an ethyl or methyl group, alternatively each alkyl group is a methyl group. The alkoxy groups in each alkyldiacetoxyalkoxysilane contains from 1 to 6 carbons; Illustrative alkoxy groups are methoxy, ethoxy, propoxy, isopropoxy, butoxy, isobutoxy, pentoxy and, hexoxy groups. Alternatively, each alkoxy group may be the same or different and may be selected from methoxy, ethoxy, propoxy, isopropoxy, butoxy and isobutoxy groups, alternatively each alkoxy group is either an ethoxy or methoxy group. In one embodiment the alkyldiacetoxyalkoxysilane is selected from methyldiacetoxymethoxysilane, ethyldiacetoxymethoxysilane, ethyldiacetoxyethoxysilane, and methyldiacetoxyethoxysilane. Alternatively, the alkyldiacetoxyalkoxysilane is methyldiacetoxymethoxysilane.

Hence in a preferred embodiment the silanol terminated polydiorganosiloxane starting material is reacted with a mixture of methylacetoxydimethoxysilane and methyldiacetoxymethoxysilane.

The use of the alkylacetoxydialkoxysilanes and alkyldiacetoxyalkoxysilanes in step (i) of the process leads to the release of acetic acid as a by-product which is the main reason for step (ii) a neutralising step.

Any suitable neutralising agent may be utilised in step (ii). These may include hexylamine, dodecylamine, di-n-hexylamine, 2-ethylhexylamine, tert-butylamine, 2-ethylhexylamine, 1,6-hexanediamine, bis(2-ethylhexyl)amine, morpholine, dicyclohexylamine, 1,8-Diazabicyclo(5.4.0)undec-7-ene (DBU), 3-aminopropyl)-triethoxysilane, 3-aminopropyl)-trimethoxysilane, aminoethylaminopropyltrimethoxysilane bis(trimethoxysilylpropyl)amine (dimethoxymethylsilyl)isobutyl)-ethylenediamine. The use of dialkyldiacetamidosilanes are particularly preferred. Dialkyldiacetamidosilanes are known chain extending materials for low modulus sealant formulations as described in for example U.S. Pat. Nos. 5,017,628 and 3,996,184 but in this instance are primarily being used to neutralise acetic acid generated during the end-capping and chain extension process. However, they may additionally provide the advantage of further chain extension when present. The dialkyldiacetamidosilanes may for example have the structure

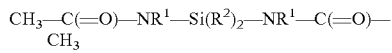

wherein each $R^1$ may be the same or different and may be the same as R as defined above, alternatively, each $R^1$ may be the same or different and may comprise an alkyl group having from 1 to 6 carbons, alternatively 1 to 4 carbons. Each $R^2$ may also be the same or different and may also be the same as R as defined above comprise an alkyl group having from 1 to 6 carbons, alternatively 1 to 4 carbons or an alkenyl group having from 2 to 6 carbons, alternatively 2 to 4 carbons, alternatively vinyl.

In one embodiment the dialkyldiacetamidosilane used as the neutralising agent may be selected from one or more of the following:—
N,N'-(dimethylsilylene)bis[N-methylacetamide]
N,N'-(dimethylsilylene)bis[N-ethylacetamide]
N,N'-(diethylsilylene)bis[N-methylacetamide]
N,N'-(diethylsilylene)bis[N-ethylacetamide]
N,N'-(dimethylsilylene)bis[N-propylacetamide]
N,N'-(diethylsilylene)bis[N-propylacetamide]
N,N'-(dipropylsilylene)bis[N-methylacetamide]
N,N'-(dipropylsilylene)bis[N-ethylacetamide]
N,N'-(methylvinylsilylene)bis[N-ethylacetamide]
N,N'-(ethylvinylsilylene)bis[N-ethylacetamide]
N,N'-(propylvinylsilylene)bis[N-ethylacetamide]
N,N'-(methylvinylsilylene)bis[N-methylacetamide]
N,N'-(ethylvinylsilylene)bis[N-methylacetamide] and/or
N,N'-(propylvinylsilylene)bis[N-methylacetamide].

Alternatively, the neutralising agent may be a dialkyldiacetamidosilane selected from N,N'-(dimethylsilylene)bis[N-ethylacetamide] and/or N,N'-(dimethylsilylene)bis[N-methylacetamide]. Alternatively, the dialkyldiacetamidosilane is N,N'-(dimethylsilylene)bis[N-ethylacetamide].

The above process generates a chain-extended alkoxy terminated polydiorganosiloxane without the need for catalysis.

When the above process is undertaken it may comprise (in the absence of additional steps, e.g. to make a final sealant or the like composition), based on the weight of the final mixture:—
(ai) silanol terminated polydiorganosiloxane starting material in an amount of from 95 to 99.5% by weight of the ingredients
(aii) mixture of one or more alkylacetoxydialkoxysilanes and one or more alkyldiacetoxyalkoxysilanes in an amount of from about 0.25 to 2.5% by weight of the ingredients and
(aiii) neutralising agent in an amount of from about 0.25 to 2.5% by weight of the ingredients.

Typically, the silanol terminated polydiorganosiloxane starting material (ai) is introduced into a suitable mixer and is stirred; the mixture of one or more alkylacetoxydialkoxysilanes and one or more alkyldiacetoxyalkoxysilanes (aii) is then added and the resulting mixture is mixed. Any suitable mixing time can be used for step (i) e.g. 10 to 30 minutes, alternatively 10 to 20 minutes. Optionally the mixing in step (i) may be carried out at an elevated temperature of up to about 80° C., e.g. 50 to 80° C. Once the mixing of step (i) is complete the neutralising agent is introduced and mixed into the resulting mixture from step (i). The mixing may take place in any suitable type of mixer e.g. a speedmixer or Turello mixer.

Once the neutralising step has been completed the resulting polymeric product may be collected and stored for future use or may be used immediately as part of a process for the preparation of a one-part low modulus sealant composition comprising:—
(a) A chain-extended alkoxy terminated polydiorganosiloxane prepared as hereinbefore described;

(b) reinforcing filler;
(c) cross-linker;
(d) cure catalyst; and optionally
(e) adhesion promoter.

Such a sealant product has both a low modulus upon cure and is non-staining in that plasticizers and/or extenders (sometime referred to as processing aids) do not leech out and stain neighbouring substrates such as concrete blocks or other building materials.

In the present case a low modulus sealant relying on the polymer made by the process described herein is reliant on the end-capping and chain extension described which results in polymer (a) which is of a high molecular weight/chain length.

In such a process the chain-extended alkoxy terminated polydiorganosiloxane (a) is the product of the hereinbefore described process. The chain-extended alkoxy terminated polydiorganosiloxane (a), i.e. the end product of the end-capping and chain extension process described above, is typically present in the composition in an amount of from 40 to 60% by weight of the sealant composition, alternatively from about 40 to 55% by weight of the sealant composition.

Reinforcing filler (b) may contain one or more finely divided, reinforcing fillers such as precipitated calcium carbonate, ground calcium carbonate, fumed silica colloidal silica and/or precipitated silica. Typically, the surface area of the reinforcing filler (b) is at least 15 m$^2$/g in the case of precipitated calcium carbonate measured in accordance with the BET method in accordance with ISO 9277: 2010, alternatively 15 to 50 m$^2$/g, alternatively, 15 to 25 m$^2$/g in the case of precipitated calcium carbonate. Silica reinforcing fillers have a typical surface area of at least 50 m$^2$/g. In one embodiment reinforcing filler (b) is a precipitated calcium carbonate, precipitated silica and/or fumed silica; alternatively, precipitated calcium carbonate. In the case of high surface area fumed silica and/or high surface area precipitated silica, these may have surface areas of from 75 to 400 m$^2$/g measured using the BET method in accordance with ISO 9277: 2010, alternatively of from 100 to 300 m$^2$/g using the BET method in accordance with ISO 9277: 2010.

Typically, the reinforcing fillers (b) are present in the composition in an amount of from about 35 to 55% by weight of the composition, alternatively from about 40 to 55% by weight of the composition, alternatively from about 40 to 50% by weight of the composition, Reinforcing filler (b) may be hydrophobically treated for example with one or more aliphatic acids, e.g. a fatty acid such as stearic acid or a fatty acid ester such as a stearate, or with organosilanes, organosiloxanes, or organosilazanes hexaalkyl disilazane or short chain siloxane diols to render the filler(s) (b) hydrophobic and therefore easier to handle and obtain a homogeneous mixture with the other adhesive components. The surface treatment of the fillers makes them easily wetted by chain-extended alkoxy terminated polydiorganosiloxane (a) of the base component. These surface modified fillers do not clump and can be homogeneously incorporated into the chain-extended alkoxy terminated polydiorganosiloxane (a) of the base component. This results in improved room temperature mechanical properties of the uncured compositions. The fillers may be pre-treated or may be treated in situ when being mixed with chain-extended alkoxy terminated polydiorganosiloxane (a).

Cross-linker (c) may be any suitable cross-linker having at least three groups per molecule which are reactable with the hydroxyl or hydrolysable groups chain-extended alkoxy terminated polydiorganosiloxane (a). Typically, cross-linker (c) is one or more silanes or siloxanes which contain silicon bonded hydrolysable groups such as acyloxy groups (for example, acetoxy, octanoyloxy, and benzoyloxy groups); ketoximino groups (for example dimethyl ketoximo, and isobutylketoximino); alkoxy groups (for example methoxy, ethoxy, isobutoxy and propoxy) and alkenyloxy groups (for example isopropenyloxy and 1-ethyl-2-methylvinyloxy).

In the case of siloxane based cross-linkers the molecular structure can be straight chained, branched, or cyclic.

Cross-linker (c) preferably has at least three or four hydroxyl and/or hydrolysable groups per molecule which are reactive with the hydroxyl and/or hydrolysable groups in chain-extended alkoxy terminated polydiorganosiloxane (a). When cross-linker (c) is a silane and when the silane has a total of three silicon-bonded hydroxyl and/or hydrolysable groups per molecule, the fourth group is suitably a non-hydrolysable silicon-bonded organic group. These silicon-bonded organic groups are suitably hydrocarbyl groups which are optionally substituted by halogen such as fluorine and chlorine. Examples of such fourth groups include alkyl groups (for example methyl, ethyl, propyl, and butyl); cycloalkyl groups (for example cyclopentyl and cyclohexyl); alkenyl groups (for example vinyl and allyl); aryl groups (for example phenyl, and tolyl); aralkyl groups (for example 2-phenylethyl) and groups obtained by replacing all or part of the hydrogen in the preceding organic groups with halogen. Preferably however, the fourth silicon-bonded organic groups is methyl.

Silanes and siloxanes which can be used as cross-linker (c) include alkyltrialkoxysilanes such as methyltrimethoxysilane (MTM) and methyltriethoxysilane, alkenyltrialkoxy silanes such as vinyltrimethoxysilane and vinyltriethoxysilane, isobutyltrimethoxysilane (iBTM). Other suitable silanes include ethyltrimethoxysilane, vinyltriethoxysilane, phenyltrimethoxysilane, alkoxytrioximosilane, alkenyltrioximosilane, 3,3,3-trifluoropropyltrimethoxysilane, methyltriacetoxysilane, vinyltriacetoxysilane, ethyl triacetoxysilane, di-butoxy diacetoxysilane, phenyltripropionoxysilane, methyltris(methylethylketoximo) silane, vinyl-tris-methylethylketoximo)silane, methyltris (methylethylketoximino)silane, methyltris(isopropenoxy) silane, vinyltris(isopropenoxy)silane, ethylpolysilicate, n-propylorthosilicate, ethylorthosilicate and/or dimethyltetraacetoxydisiloxane. Cross-linker (c) may alternatively comprise any combination of two or more of the above.

Alternatively, cross-linker (c) may comprise a silyl functional molecule containing two or more silyl groups, each silyl group containing at least one —OH or hydrolysable group, the total of number of —OH groups and/or hydrolysable groups per cross-linker molecule being at least 3. Hence, a disilyl functional molecule comprises two silicon atoms each having at least one hydrolysable group, where the silicon atoms are separated by an organic or siloxane spacer. Typically, the silyl groups on the disilyl functional molecule may be terminal groups. The spacer may be a polymeric chain having a siloxane or organic polymeric backbone. In the case of such siloxane or organic based cross-linkers (ii) the molecular structure can be straight chained, branched, cyclic or macromolecular. In the case of siloxane-based polymers the viscosity of the cross-linker (c) will be within the range of from 0.5 mPa·s to 80,000 mPa·s at 25° C. was measured in accordance with ASTM D1084-16 using a Brookfield rotational viscometer with spindle CP-52 at 1 rpm.

For example, cross-linker (c) may be a disilyl functional polymer, that is, a polymer containing two silyl groups, each having at least one hydrolysable group such as described by the formula

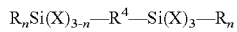

where each R, and n may be individually selected as hereinbefore described above. $R^4$ is an alkylene (divalent hydrocarbon group), alternatively an alkylene group having from 1 to 10 carbon atoms, or further alternatively 1 to 6 carbon atoms or a combination of said divalent hydrocarbon groups and divalent siloxane groups.

Each X group may be the same or different and can be a hydroxyl group or a condensable or hydrolyzable group. The term "hydrolyzable group" means any group attached to the silicon which is hydrolyzed by water at room temperature. The hydrolyzable group X includes groups of the formula —OT, where T is an alkyl group such as methyl, ethyl, isopropyl, octadecyl, an alkenyl group such as allyl, hexenyl, cyclic groups such as cyclohexyl, phenyl, benzyl, beta-phenylethyl; hydrocarbon ether groups, such as 2-methoxyethyl, 2-ethoxyisopropyl, 2-butoxyisobutyl, p-methoxyphenyl or —(CH$_2$CH$_2$O)$_2$CH$_3$. The most preferred X groups are hydroxyl groups or alkoxy groups. Illustrative alkoxy groups are methoxy, ethoxy, propoxy, isopropoxy, butoxy, isobutoxy, pentoxy, hexoxy octadecyloxy and 2-ethylhexoxy; dialkoxy groups, such as methoxymethoxy or ethoxymethoxy and alkoxyaryloxy, such as ethoxyphenoxy. The most preferred alkoxy groups are methoxy or ethoxy.

Preferred di-silyl functional polymer cross-linkers have n=0 or 1, X=OMe and $R^4$ being an alkylene group with 4 to 6 carbons.

Examples of disilyl polymeric cross-linkers with a silicone or organic polymer chain bearing alkoxy functional end groups include polydimethylsiloxanes having at least one trialkoxy terminal where the alkoxy group may be a methoxy or ethoxy group. Examples might include or 1,6-bis(trimethoxy silyl)hexane, hexamethoxydisiloxane, hexaethoxydisiloxane, hexa-n-propoxydisiloxane, hexa-n-butoxydisiloxane, octaethoxytrisiloxane, octa-n-butoxytrisiloxane and decaethoxy tetrasiloxane. In one embodiment the cross-linker may be one or more of vinyltrimethoxysilane, methyltrimethoxysilane and/or vinylmethyldimethoxysilane.

The amount of cross-linker present in the composition will depend upon the particular nature of the cross-linker (c) utilised and in particular, the molecular weight of the molecule selected. The compositions suitably contain cross-linker (c) in at least a stoichiometric amount as compared to chain-extended alkoxy terminated polydiorganosiloxane (a) described above. The cross-linker is therefore typically present in the composition in an amount of from 0.1 to 5% by weight of the composition.

The low modulus sealant composition may be cured using one of the following cure catalysts (d):—
(i) a chelated titanate catalyst,
(ii) a chelated zirconate catalyst,
(iii) an optionally chelated titanate in combination with a metal carboxylate salt and/or
(iv) an optionally chelated zirconate in combination with a metal carboxylate salt.
The Catalyst (d) may additionally comprise a tin catalyst (v).

The titanate and/or zirconate (i) chosen for inclusion in a particular silicone sealant composition depends upon the speed of cure required. Titanate and/or zirconate based cure catalysts (d) may comprise a compound according to the general formula Ti[OR$^9$]$_4$ or Zr[OR$^9$]$_4$ where each R$^9$ may be the same or different and represents a monovalent, primary, secondary or tertiary aliphatic hydrocarbon group which may be linear or branched containing from 1 to 10 carbon atoms. Optionally the titanate may contain partially unsaturated groups. However, preferred examples of R$^9$ include but are not restricted to methyl, ethyl, propyl, isopropyl, butyl, tertiary butyl and a branched secondary alkyl group such as 2,4-dimethyl-3-pentyl. Preferably, when each R$^9$ is the same, R$^9$ is an isopropyl, branched secondary alkyl group or a tertiary alkyl group, in particular, tertiary butyl. Suitable examples include for the sake of example, tetra n-butyl titanate, tetra t-butyl titanate, tetra t-butoxy titanate, tetraisopropoxy titanate and diisopropoxydiethylacetoacetate titanate (as well as zirconate equivalents). Alternatively, the titanate/zirconate may be chelated. The chelation may be with any suitable chelating agent such as an alkyl acetylacetonate such as methyl or ethylacetylacetonate. Alternatively, the titanate may be monoalkoxy titanates bearing three chelating agents such as for example 2-propanolato, tris isooctadecanoato titanate.

In the present disclosure the cure catalyst may also comprise a metal carboxylate salt (in options (iii) and (iv)) wherein the metal is selected from one or more of zinc, aluminium, bismuth iron and/or zirconium. The carboxylate groups are of the formula R$^{15}$COO$^-$ where R$^{15}$ is selected from hydrogen, alkyl groups, alkenyl groups, and aryl groups. Examples of useful alkyl groups for R$^{15}$ include alkyl groups having from 1 to 18 carbon atoms, alternatively 1 to 8 carbon atoms. Examples of useful alkenyl groups for R$^{15}$ include alkenyl groups having from 2 to 18 carbon atoms, alternatively 2 to 8 carbon atoms such as vinyl, 2-propenyl, allyl, hexenyl, and octenyl. Examples of useful aryl groups for R$^{15}$ include aryl groups having from 6 to 18 carbon atoms, alternatively 6 to 8 carbon atoms such as phenyl and benzyl. Alternatively, R$^{15}$ is methyl, 2-propenyl, allyl, and phenyl. Hence the metal carboxylate salt (ii) in catalyst (e) may be zinc (II) carboxylates, aluminium (III) carboxylates, bismuth (III) carboxylates and/or zirconium (IV) carboxylates, zinc (II) alkylcarboxylates, aluminium (III) alkylcarboxylates, bismuth (III) alkylcarboxylates and/or zirconium (IV) alkylcarboxylates or mixtures thereof. Specific examples of metal carboxylate salt (ii) in catalyst include, zinc ethylhexanoate, bismuth ethylhexanoate zinc stearate, zinc undecylenate, zinc neodecanoate, and iron (III) 2-ethylhexanoate. The titanate and/or zirconate (i) and metal carboxylate salt (ii) of catalyst is provided in a molar ratio of 1:4 to 4:1.

Hence, for the sake of example, the catalyst used may be one of the following: Diisopropoxydi(ethoxyacetoacetyl) titanate,
a mixture of Diisopropoxydi(ethoxyacetoacetyl)titanate and methyltrimethoxysilane e.g. in a weight ratio of from 5:1 to 1:1, alteratively from 5:1 to 2.5:1, alternatively from 5:1 to 3.5:1;
tetra t-butyl Titanate (TtbT))/methylacetoacetate (MAA)) in a weight ratio of from 5:1 to 1:1, alteratively from 5:1 to 2.5:1, alternatively from 5:1 to 3.5:1; or Diisopropoxydi (ethoxyacetoacetyl)titanate/Zinc ethylhexanoate mixture or a TtbT/MAA mixture with Zn(EHA)$_2$.

Catalyst (d) is typically present in the composition in an amount of from 0.25 to 4.0% by weight of the composition, alternatively from 0.25 to 3% by weight of the composition, alternatively from 0.3% to 2.5% by weight of the composition.

Optionally catalyst (d) may also additionally include a tin catalyst (v). Said tin catalyst, if used, must be compatible with the other components of the catalyst (d). Examples include tin triflates, organic tin metal catalysts such as triethyltin tartrate, tin octoate, tin oleate, tin naphthate, butyltintri-2-ethylhexoate, tin butyrate, carbomethoxyphenyl tin trisuberate, isobutyltintriceroate, and diorganotin salts especially diorganotin dicarboxylate compounds such as dibutyltin dilaurate, dimethyltin dibutyrate, dibutyltin dimethoxide, dibutyltin diacetate, dimethyltin bisneodecanoate, dibutyltin dibenzoate, stannous octoate, dibutyltin bis(2,4-pentanedionate, dimethyltin dineodecanoate (DMTDN) and dibutyltin dioctoate.

When present, component (e) is an adhesion promoter, suitable adhesion promoters (e) may comprise alkoxysilanes of the formula $R^{14}{}_{h}Si(OR^{15})_{(4-h)}$, where subscript h is 1, 2, or 3, alternatively h is 3. Each $R^{14}$ is independently a monovalent organofunctional group. $R^{14}$ can be an epoxy functional group such as glycidoxypropyl or (epoxycyclohexyl)ethyl, an amino functional group such as aminoethylaminopropyl or aminopropyl, a methacryloxypropyl, a mercapto functional group such as mercaptopropyl or an unsaturated organic group. Each $R^{15}$ is independently an unsubstituted, saturated hydrocarbon group of at least 1 carbon atom. $R^{15}$ may have 1 to 4 carbon atoms, alternatively 1 to 2 carbon atoms. $R^{15}$ is exemplified by methyl, ethyl, n-propyl, and iso-propyl.

Alternatively the adhesion promoter may be glycidoxypropyltrimethoxysilane or a multifunctional material obtained by reacting two or more of the above. For examples the reaction product of an alkylalkoxysilicone e.g. trimethoxymethylsilane; an aminoalkoxysilane, e.g. 3-aminopropyl trimethoxysilane and an epoxyalkoxysilane e.g. glycidoxypropyl trimethoxysilane; in a weight ratio of (i):(ii):(iii) of 0.1-6:0.1-5:1.

Examples of suitable adhesion promoters (e) may also include and molecules of the structure

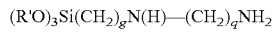

$(R'O)_3Si(CH_2)_gN(H)-(CH_2)_qNH_2$ in which each R' may be the same or different and is an alkyl group containing from 1 to 10 carbon atoms, g is from 2 to 10 and q is from 2 to 10.

The one-part silicone sealant composition may comprise, when present, 0.01% to 2 wt. %, alternatively 0.05 to 2 wt. %, alternatively 0.1 to 1 wt. % of adhesion promoter based on the weight of the composition. Preferably, the speed of hydrolysis of the adhesion promoter should be lower than the speed of hydrolysis of the cross-linker in order to favour diffusion of the molecule towards the substrate rather than its incorporation in the product network.

Other additives may be used if necessary. These may include rheology modifiers, stabilizers such as anti-oxidants, UV and/or light stabilizers, pigments, water scavengers, (typically silazanes or the same compounds as those used as cross-linkers), and fungicides and/or biocides and the like; It will be appreciated that some of the additives are included in more than one list of additives. Such additives would then have the ability to function in all the different ways referred to.

Rheology modifiers which may be incorporated in moisture curable compositions according to the invention include silicone organic co-polymers such as those described in EP0802233 based on polyols of polyethers or polyesters; waxes such as polyamide waxes, non-ionic surfactants selected from the group consisting of polyethylene glycol, polypropylene glycol, ethoxylated castor oil, oleic acid ethoxylate, alkylphenol ethoxylates, copolymers or ethylene oxide and propylene oxide, and silicone polyether copolymers; as well as silicone glycols. For some systems these rheology modifiers, particularly copolymers of ethylene oxide and propylene oxide, and silicone polyether copolymers, may enhance the adhesion to substrates, particularly plastic substrates.

Any suitable anti-oxidant(s) may be utilised, if deemed required. Examples may include: ethylene bis(oxyethylene) bis(3-tert-butyl-4-hydroxy-5(methylhydrocinnamate) 36443-68-2; tetrakis[methylene(3,5-di-tert-butyl-4-hydroxy hydrocinnamate)]methane 6683-19-8; octadecyl 3,5-di-tert-butyl-4-hydroxyhyrocinnamate 2082-79-3; N,N'-hexamethylene-bis(3,5-di-tert-butyl-4-hydroxyhyrocinnamamide) 23128-74-7; 3,5-di-tert-butyl-4-hydroxyhydrocinnamic acid, C7-9 branched alkyl esters 125643-61-0; N-phenylbenzene amine, reaction products with 2,4,4-trimethylpentene 68411-46-1; e.g. anti-oxidants sold under the Irganox® name from BASF.

UV and/or light stabilizers may include, for the sake of example include benzotriazole, ultraviolet light absorbers and/or hindered amine light stabilizers (HALS) such as the TINUVIN® product line from Ciba Specialty Chemicals Inc.

Pigments are utilized to color the composition as required. Any suitable pigment may be utilized providing it is compatible with the composition. In two-part compositions pigments and/or colored (non-white) fillers, e.g. carbon black may be utilized in the catalyst package to color the end adhesive product. When present carbon black will function as both a non-reinforcing filler and colorant and is present in a range of from 1 to 30% by weight of the catalyst package composition, alternatively from 1 to 20% by weight of the catalyst package composition; alternatively, from 5 to 20% by weight of the catalyst package composition, alternatively, from 7.5 to 20% by weight of the catalyst composition.

Any suitable moisture/water scavenger may be used, for example orthoformic acid esters, molecular sieves and/or one or more silanes of the structure

$R^6{}_jSi(OR^5)_{4-j}$ where each $R^5$ may be the same or different and is an alkyl group containing at least 2 carbon atoms;
j is 1 or 0; and
$R^6$ is a silicon-bonded organic group selected from a substituted or unsubstituted straight or branched monovalent hydrocarbon group having at least 2 carbons, a cycloalkyl group, an aryl group, an aralkyl group or any one of the foregoing wherein at least one hydrogen atom bonded to carbon is substituted by a halogen atom, or an organic group having an epoxy group, a glycidyl group, an acyl group, a carboxyl group, an ester group, an amino group, an amide group, a (meth)acryl group, a mercapto group or an isocyanate group.

Biocides may additionally be utilized in the composition if required. It is intended that the term "biocides" includes bactericides, fungicides and algicides, and the like. Suitable examples of useful biocides, which may be utilized in compositions as described herein, include, for the sake of example:

Carbamates such as methyl-N-benzimidazol-2-ylcarbamate (carbendazim) and other suitable carbamates, 10,10'-oxybisphenoxarsine, 2-(4-thiazolyl)-benzimidazole, N-(fluorodichloromethylthio)phthalimide, diiodomethyl p-tolyl sulfone, if appropriate in combination with a UV stabilizer, such as 2,6-di(tert-butyl)-p-cresol, 3-iodo-2-propinyl butylcarbamate (IPBC), zinc 2-pyridinethiol 1-oxide, triazolyl compounds and isothiazolinones, such as 4,5-dichloro-2-(n-octyl)-4-isothiazolin-3-one (DCOIT), 2-(n-octyl)-4-isothiazolin-3-one (OIT) and n-butyl-1,2-benzisothiazolin-3-one (BBIT). Other biocides might include for example Zinc Pyridinethione, 1-(4-Chlorophenyl)-4,4-dimethyl-3-(1,2,4-triazol-1-ylmethyl)pentan-3-ol and/or 1-[[2-(2,4-dichlorophenyl)-4-propyl-1,3-dioxolan-2-yl]methyl]-1H-1,2,4-triazole.

The fungicide and/or biocide may suitably be present in an amount of from 0 to 0.3% by weight of the composition and may be present in an encapsulated form where required such as described in EP2106418.

In general polymer (a) is prepared as described above, which is at least partially completed prior to addition of the other ingredients. Typically, once step (ii) of the end-capping/chain-extension process stage is completed, i.e. addition of the neutralising agent into the polymer composition, the additional ingredients of the one-part the other ingredients may be introduced into the composition in any suitable order. Typically, the first ingredient added is the filler(s) (b) so as to effectively form a base comprising the chain-extended alkoxy terminated polydiorganosiloxane (a) and filler (b). The other ingredients may then be added in any preferred order of the addition such as cross-linker (c) followed by cure catalyst (d) followed by adhesion promoter (e) with the optional additional ingredients (f) added as and if required.

The one-part silicone sealant composition may comprise (a) a chain-extended alkoxy terminated polydiorganosiloxane prepared as hereinbefore described using the following starting ingredients (ai) the OH polymer content in the sealant formation is in the range of 25%-60% by weight of the final composition;

(aii) a mixture of one or more alkylacetoxydialkoxysilanes and one or more alkyldiacetoxyalkoxysilanes in the range of 0.05%-0.5% by weight of the final composition;

(aiii) adialkyldiacetamidosilane in the range of 0.05%-0.5% of the final composition; the one-part silicone sealant composition will also comprise:

(b) filler in the amount of from 25%-60% by weight of the final composition;

(c) cross-linker content in the amount of from 1-5% by weight of the final composition.

(d) catalyst as hereinbefore described in an amount of from 0.1%-2% by weight of the final composition; and when present (e) adhesion promoter in amount of from 0.05%-to 3% by weight of the final composition.

The total amount of the ingredients of the sealant composition is 100 weight %.

The compositions are preferably room temperature vulcanisable compositions in that they cure at room temperature without heating but may if deemed appropriate be accelerated by heating. The mixing process could be in a speed mixer or other mixing equipment. Mixing equipment with vacuum and heating capabilities are more preferred.

The ingredients and their amounts may be designed to provide a low modulus and high extension sealant, adhesive and/or coating composition. Low modulus silicone sealant compositions are preferably "gunnable" i.e. they have a suitable extrusion capability i.e. a minimum extrusion rate of 10 ml/min as measured by ASTM C1183-04, alternatively 10 to 1000 mL/min, and alternatively 100 to 1000 mL/min.

The ingredients and their amounts in the sealant composition may be selected to impart a movement capability to the post-cured sealant material. The movement capability is greater than 25%, alternatively movement capability ranges from 25% to 50%, as measured by ASTM C719-13.

A sealant composition as hereinbefore described may be a gunnable sealant composition used for
(i) space/gap filling applications;
(ii) seal applications, such as sealing the edge of a lap joint in a construction membrane; or
(iii) seal penetration applications, e.g., sealing a vent in a construction membrane;
(iv) adhering at least two substrates together.
(v) a laminating layer between two substrates to produce a laminate of the first substrate, the sealant product and the second substrate.

In the case of (v) above, when used as a layer in a laminate, the laminate structure produced is not limited to these three layers. Additional layers of cured sealant and substrate may be applied. The layer of gunnable sealant composition in the laminate may be continuous or discontinuous.

A sealant composition as hereinbefore described may be applied on to any suitable substrate. Suitable substrates may include, but are not limited to, glass; concrete; brick; stucco; metals, such as aluminium, copper, gold, nickel, silicon, silver, stainless steel alloys, and titanium; ceramic materials; plastics including engineered plastics such as epoxies, polycarbonates, poly(butylene terephthalate) resins, polyamide resins and blends thereof, such as blends of polyamide resins with syndiotactic polystyrene such as those commercially available from The Dow Chemical Company, of Midland, Mich., U.S.A., acrylonitrile-butadiene-styrenes, styrene-modified poly(phenylene oxides), poly(phenylene sulfides), vinyl esters, polyphthalamides, and polyimides; cellulosic substrates such as paper, fabric, and wood; and combinations thereof. When more than one substrate is used, there is no requirement for the substrates to be made of the same material. For example, it is possible to form a laminate of plastic and metal substrates or wood and plastic substrates.

In the case of silicone sealant compositions as hereinbefore described, there is provided a method for filling a space between two substrates so as to create a seal therebetween, comprising:
a) providing a silicone composition as hereinbefore described, and either
b) applying the silicone composition to a first substrate, and bringing a second substrate in contact with the silicone composition that has been applied to the first substrate, or
c) filling a space formed by the arrangement of a first substrate and a second substrate with the silicone composition and curing the silicone composition.

In one alternative, a sealant composition as hereinbefore described may be a self-levelling sealant, e.g. a self-levelling highway sealant. A self-levelling sealant composition means it is "self-levelling" when extruded from a storage container into a horizontal joint; that is, the sealant will flow under the force of gravity sufficiently to provide intimate contact between the sealant and the sides of the joint space. This allows maximum adhesion of the sealant to the joint surface to take place. The self-levelling also does away with the necessity of tooling the sealant after it is placed into the joint, such as is required with a sealant which is designed for use in both horizontal and vertical joints. Hence, the sealant flow sufficiently well to fill a crack upon application. If the sealant has sufficient flow, under the force of gravity, it will form an intimate contact with the sides of the irregular crack walls and form a good bond; without the necessity of tooling the sealant after it is extruded into the crack, in order to mechanically force it into contact with the crack sidewalls.

Self-levelling compositions as described herein are useful as a sealant having the unique combination of properties required to function in the sealing of asphalt pavement. Asphalt paving material is used to form asphalt highways by building up an appreciable thickness of material, such as 20.32 cm, and for rehabilitating deteriorating concrete highways by overlaying with a layer of a thickness such as 10.16 cm. Asphalt overlays undergo a phenomenon known as reflection cracking in which cracks form in the asphalt overlay due to the movement of the underlying concrete at the joints present in the concrete. These reflection cracks need to be sealed to prevent the intrusion of water into the crack, which will cause further destruction of the asphalt pavement when the water freezes and expands.

In order to form an effective seal for cracks that are subjected to movement for any reason, such as thermal expansion and contraction, the seal material must bond to the interface at the sidewall of the crack and must not fail cohesively when the crack compresses and expands. In the case of the asphalt pavement, the sealant must not exert enough strain on the asphalt at the interface to cause the asphalt itself to fail; that is, the modulus of the sealant must be low enough that the stress applied at the bond line is well below the yield strength of the asphalt.

In such instances, the modulus of the cured material is designed to be low enough so that it does not exert sufficient force on the asphalt to cause the asphalt to fail cohesively. The cured material is such that when it is put under tension, the level of stress caused by the tension decreases with time so that the joint is not subjected to high stress levels, even if the elongation is severe.

Alternatively, the silicone elastomeric composition provided herein may be utilised as an elastomeric coating composition, e.g. as a barrier coating for construction materials or as a weatherproof coating for a roof, the composition may have a viscosity not dissimilar to a paint thereby enabling application by e.g. brush, roller or spray gun or the like. A coating composition as described herein, when applied onto a substrate, may be designed to provide the substrate with e.g. long-term protection from air and water infiltration, under normal movement situations caused by e.g. seasonal thermal expansion and/or contraction, ultraviolet light and the weather. Such a coating composition can maintain water protection properties even when exposed to sunlight, rain snow or temperature extremes.

EXAMPLES

A silanol terminated polydiorganosiloxane was mixed with an assortment of potential capping and chain extending agents following step (i) of the process described above, resulting in a number of examples and comparatives in an attempt to provide a chain-extended alkoxy terminated polydiorganosiloxane. The compositions used are identified in Table 1 below.

MAM is a mixture of methylacetoxydimethoxysliane and methyldiacetoxymethoxysliane and functions as a capping agent and chain extender for the examples herein.

In this instance the N,N'-(dimethylsilylene)bis[N-ethylacetamide] was introduced into Example 2 to assess its usefulness as a chain-extender using the currently uncatalyzed process after the reaction has been at least partially completed.

The variation of viscosity of the mixture with time was assessed with time and the increase in viscosity for example 1 and comparatives 1 to 3 are shown in Table 2 below. The viscosity test was performed using a Brookfield DVIII Ultra with cone 52 under 5 rpm for 2 mins. Compositions were mixed and measured at room temperature (about 25° C.).

TABLE 2

Viscosity change with time of Comp. 1 to 3 and Ex. 1

| Time, min | Comp. 1 | Time, min | Comp. 2 | Time, min | Comp. 3 | Time, min | Ex. 1 |
|---|---|---|---|---|---|---|---|
| 0 | 57622 | 0 | 57622 | 0 | 57373 | 0 | 57468 |
| 5 | 64930 | 5 | 57627 | 7 | 85409 | 7 | 62548 |
| 15 | 75757 | 15 | 56357 | 12 | 90489 | 16 | 68581 |
| 52 | 78265 | 35 | 57151 | 36 | 107000 | 30 | 73502 |

Table 2 shows the viscosity of each formulated sample along with time was monitored to verify if capping reaction occurred. It will be seen that in the cases of Comp. 1, comp. 3 and Ex. 1 the polymer viscosity increased along with time, indicating that the capping reaction between the silanol group and the functional silane occurred. However, in the case of Comp. 2 in which vinyltrimethoxysilane (VTM) was used as the potential capping agent, no viscosity increase was seen, instead, the viscosity slightly dropped which was assumed to indicate a dilution effect due to the introduction of the VTM together with the lack of end-capping reaction taking place. While with MTA/ETA, the viscosity increased dramatically with time, indicating further crosslinking occurred. For Comp.1, The VOS end-capping had been previously undertaken in 1-part oxime clean sealant.

The progress of the reaction was tracked by determining the levels of the —OH content of the silanol terminated polydiorganosiloxane using by Fourier Transform Infra-red (FTIR) spectroscopy using a single-reflection attenuated total reflection (ATR) attachment equipped with a Diamond crystal. Depth of penetration during the ATR analysis was estimated to be 2 μm. The spectrum was collected using a Thermo Electron Nicolet 5700 Optical Bench with 32 scans at 4 cm$^{-1}$ resolution. This is depicted in Table 3 below.

TABLE 1

Examples of silanol-terminated polymer capping (All the components are in grams)

| Compositions | Comp. 1 | Comp. 2 | Comp. 3 | Ex. 1 | Ex. 2 |
|---|---|---|---|---|---|
| Dimethylsilanol terminated polydimethyl siloxane viscosity 50,000mPa.s | 47.65 | 47.65 | 47.65 | 47.65 | 47.65 |
| Vinyltris (methylethylketoxime)silane (VOS) | 0.48 | | | | |
| Vinylltrimethoxysilane (VTM) | | 0.68 | | | |
| mixture of Methyltriacetoxysilane (MTA) and Ethyltriacetoxysilane (ETA) in a weight ratio of 46: 49 | | | 0.25 | | |
| MAM | | | | 0.25 | 0.25 |
| N,N'-(dimethylsilylene)bis[N-ethylacetamide] | | | | | 0.2 |

TABLE 3

| —OH content of polymer before and after capping | |
|---|---|
| Sample | OH content, ppm |
| Dimethyl silanol terminated polydimethylsiloxane viscosity 50,000 mPa.s | 653 |
| polydimethylsiloxane End Product Example 1 | 239 |
| polydimethylsiloxane End Product Example 2 | 179 |

The polydimethylsiloxane resulting from the process of Ex. 1 had a 60%+ drop in —OH content showing a significant level of end-capping. The —OH content was further reduced with respect to Ex. 2 in which the N,N'-(dimethylsilylene)bis[N-ethylacetamide] was added and it appeared that the latter has participated in the chain extension process, given the additional lowering in the level of —OH content.

It was also envisaged that introduction of the N,N'-(dimethylsilylene)bis[N-ethylacetamide] would potentially neutralize the acetic acid resulting as a bi-product of the capping reaction. This was considered particularly advantageous because acetic acid may have some negative effect on the sealant shelf life as well as the substrate during sealant application. The IR spectra for the product of Ex. 1 showed an obvious carbonyl peak, due to the presence of the acetic acid, whilst the same peak disappeared in the spectra of example 2, indicating that the acetic acid generated from the capping reaction had been neutralised by the acetamide.

As discussed earlier, the end-capping reaction may be undertaken in isolation leading to an alkoxy end-capped polydimethylsiloxane or the like. Alternatively, the end-product of the capping reaction may be utilised as an intermediate or starting polymer in the manufacture of a one-part alkoxy sealant composition. The compositions used for two example formulations and a further comparative are provided in Table 4. A more detailed description of the process to make the latter is depicted in the following process which was produced by speed mixer. Detailed preparation process as below.

TABLE 4

| one-part alkoxy sealant compositions | | | |
|---|---|---|---|
| Capping Reactants | Comp. B1 | Ex. B1 | Ex. B2 |
| Dimethyl silanol terminated polydimethylsiloxane viscosity 50,000 mPa.s | 47.65 | 47.65 | 47.65 |
| MAM | | 0.25 | 0.25 |
| N, N'-(dimethylsilylene)bis[N-ethylacetamide] | | 0.23 | 0.23 |
| one-part sealant Formulation in addition to capped polymer resulting from process described herein | | | |
| Precipitated calcium carbonate | 25.00 | 25.00 | 25.00 |
| Ground calcium carbonate | 19.43 | 18.95 | 18.75 |
| Methyltrimethoxysilane | 1.00 | 1.00 | 1.00 |
| Vinylmethyldimethoxysilane | 2.80 | 2.80 | 2.80 |
| Adhesion Promoter | 0.20 | 0.20 | 0.20 |
| Carbon Black pigment | 3.12 | 3.12 | 3.12 |
| Cure Catalyst 1 | 0.800 | 0.800 | |
| Cure catalyst 2 | | | 1 |
| Total | 100 | 100 | 100 |

The ground calcium carbonate used was type 203A obtained from Qunxin Powder Technology and the precipitated calcium carbonate used was XTCC 201 from Xintai Nano Material.

Cure Catalyst 1 was an example of a chelated titanate catalyst, namely Diisopropoxydi(ethoxyacetoacetyl)titanate in a 4:1 mixture with Methylltrimethoxysilane (i.e. a 0.64% amount of titanate).

Cure catalyst 2 Diisopropoxydi(ethoxyacetoacetyl)titanate and zinc ethylhexanoate (i.e. a 0.64% amount of titanate). The adhesion promoter used was the reaction product of (i) trimethoxymethylsilane, (ii) 3-aminopropyl trimethoxysilane and (iii) glycidoxypropyl trimethoxysilane.

The components of each example B1 and B2 in table 4 were prepared as a one-part sealant as follows:—
Preparation of Alkoxy Capped Polymer
1) The silanol-terminated polydimethylsiloxane and pigment into a mixing cup, mixing twice at 2500 rpm for 20 s;
2) MAM mixture was then added into the mixing cup, and the resulting mixture was mixing twice at 2500 rpm for 20 s;
The resulting mixture was then left at rest (no further mixing) at room temperature (RT) for 30 mins or 50° C. for 15 min;
3) thereafter the N,N'-(dimethylsilylene)bis[N-ethylacetamide] was added to neutralise the acidic bi-product, and the resulting mixture was mixing twice at 2500 rpm for 20 s;
Preparation of the One-Part Alkoxy Sealant Composition
4) To the neutralised product of (3) above was added a mixture of precipitated calcium carbonate and ground calcium carbonate and the resulting mixture was mixing four times at 2500 rpm for 20 s;
5) a mixture of methyltrimethoxysilane and vinylmethyldimethoxysilane was then introduced and the resulting composition was mixed twice at 2500 rpm for 20 s;
6) The cure catalyst was then added and the resulting composition was mixed twice at 2500 rpm for 20 s;
7) Finally, the adhesion promoter was introduced into the composition and the resulting composition was mixed twice at 2500 rpm for 20 s.

The resulting sealant samples were cast onto a variety of substrates, for example plastic film as well as stone substrate to check some general properties. Dumbbell shaped test pieces were used for testing in accordance with ASTM D412-98a(2002)e1

TABLE 5

Physical Properties of 1part silicone sealant

|  | Comp. B1 | Ex. B1 | Ex. B2 |
|---|---|---|---|
| SOT/TFT, min (ASTM C679-15) | 10/10 | 15/16 | 13/14 |
| Tensile strength (RT, 7-day curing), MPa (ASTM D412-98a(2002)e1) | Almost no strength | 0.91 | 0.72 |
| Modulus at 100% extension (RT, 7-day curing), MPa (ASTM D412-98a(2002)e1) | NA | 0.25 | 0.19 |

Table 5 shows a comparative example with no capping and two examples with MAM capping. Without MAM capping, the as developed sealant after 7 days curing showed almost no strength, which was easily fractured (Comparative Example B1). While for Example B1 and B2 with MAM capping, good tensile strength and low modulus at 100% extension were demonstrated.

What is claimed is:

1. A process for preparing a chain-extended alkoxy polydiorganosiloxane from a silanol terminated polydiorganosiloxane starting material, the process:
    (i) reacting the silanol terminated polydiorganosiloxane starting material with a mixture of one or more alkylacetoxydialkoxysilanes and one or more alkyldiacetoxyalkoxysilanes wherein each alkyl group may be the same or different and contains from 1 to 6 carbons and each alkoxy group may be the same or different and contains from 1 to 6 carbons; and
    (ii) neutralising the resulting mixture from step (i).

2. The process for preparing a chain-extended alkoxy polydiorganosiloxane in accordance with claim 1, wherein each alkylacetoxydialkoxysilane comprises an alkyl group having from 1 to 6 carbons and two alkoxy groups each of which contain from 1 to 6 carbons.

3. The process for preparing a chain-extended alkoxy polydiorganosiloxane in accordance with claim 1, wherein each alkyldiacetoxyalkoxysilane comprises an alkyl group having from 1 to 6 carbons and an alkoxy group containing from 1 to 6 carbons.

4. The process for preparing a chain-extended alkoxy polydiorganosiloxane in accordance with claim 1, wherein in step (i) the silanol terminated polydiorganosiloxane starting material is reacted with a mixture of methylacetoxydimethoxysilane and methyldiacetoxymethoxysilane.

5. The process for preparing a chain-extended alkoxy polydiorganosiloxane in accordance with claim 1, wherein a neutralising agent is utilised in step (ii) and is selected from the group consisting of hexylamine, dodecylamine, di-n-hexylamine, 2-ethylhexylamine, tert-butylamine, 2-ethylhexylamine, 1,6-hexanediamine, bis(2-ethylhexyl)amine, morpholine, dicyclohexylamine, 1,8-Diazabicyclo(5.4.0)undec-7-ene (DBU), (3-aminopropyl)-triethoxysilane, (3-aminopropyl)-trimethoxysilane, aminoethylaminopropyltrimethoxysilane bis(trimethoxysilylpropyl)amine, (dimethoxymethylsilyl)isobutyl)-ethylenediamine, dialkyldiacetamidosilanes, and combinations thereof.

6. The process for preparing a chain-extended alkoxy polydiorganosiloxane in accordance with claim 1, wherein a neutralising agent is utilised in step (ii) and is a dialkyldiacetamidosilane selected from N,N'-(dimethylsilylene)bis[N-ethylacetamide] and/or N,N'-(dimethylsilylene)bis[N-methylacetamide].

7. The process for preparing a chain-extended alkoxy polydiorganosiloxane in accordance with claim 1, wherein components of the reaction process are present in the following amounts:
    (ai) silanol terminated polydiorganosiloxane starting material in an amount of from 95 to 99.5% by weight of the ingredients;
    (aii) mixture of one or more alkylacetoxydialkoxysilanes and one or more alkyldiacetoxyalkoxysilanes in an amount of from about 0.25 to 2.55 by weight of the ingredients; and
    (aiii) neutralising agent in an amount of from about 0.25 to 2.5 % by weight of the ingredients.

8. The process for preparing a chain-extended alkoxy polydiorganosiloxane in accordance with claim 1, wherein once step (ii) has completed, the resulting polymeric product is collected and stored for future use or utilised in a process for preparing a one-part low modulus sealant composition, the sealant composition comprising:
    (a) the chain-extended alkoxy terminated polydiorganosiloxane;
    (b) reinforcing filler;
    (c) cross-linker; and
    (d) cure catalyst; and optionally
    (e) adhesion promoter.

9. An alkoxy end-capped, chain extended polydiorganosiloxane polymer obtained from the process of claim 1.

10. A one-part low modulus sealant composition comprising:
    (a) a chain-extended alkoxy terminated polydiorganosiloxane;
    (b) reinforcing filler;
    (c) cross-linker; and
    (d) cure catalyst; and optionally
    (e) adhesion promoter;
    wherein component (a) obtained from the process of claim 1.

11. The one-part low modulus sealant composition in accordance with claim 10, wherein cure catalyst (d) is selected from the group consisting of:
    (i) a chelated titanate catalyst;
    (ii) a chelated zirconate catalyst;
    (iii) an optionally chelated titanate in combination with a metal carboxylate salt; and/or
    (iv) an optionally chelated zirconate in combination with a metal carboxylate salt; and
    combinations thereof;
    optionally, wherein cure catalyst (d) additionally includes
    (v) a tin catalyst.

12. The one-part low modulus sealant composition in accordance with claim 10, which is gunnable and/or self-levelling.

13. The one-part low modulus sealant composition in accordance with claim 10, capable of being applied as a paste to a joint between two adjacent substrate surfaces where it can be worked, prior to curing, to provide a smooth surfaced mass which will remain in its allotted position until it has cured into an elastomeric body adherent to the adjacent substrate surfaces.

14. A silicone elastomer which is the reaction product of the one-part low modulus sealant composition in accordance with claim 10.

15. A sealant suitable for use in the facade, insulated glass, window construction, automotive, solar and construction fields, wherein the sealant comprises or is formed from the one-part low modulus sealant composition in accordance with claim 10.

16. A method for filling a space between two substrates so as to create a seal therebetween, the method comprising:
a) providing the one-part low modulus sealant composition in accordance with claim 10; and either b) or c);
b) applying the sealant composition to a first substrate, and bringing a second substrate in contact with the sealant composition that has been applied to the first substrate, or
c) filling a space formed by the arrangement of a first substrate and a second substrate with the sealant composition and curing the sealant composition.

17. The method for filling a space between two substrates in accordance with claim 16, wherein the space is filled by introducing the sealant composition by way of extrusion or through a sealant gun.

* * * * *